United States Patent [19]

Niess et al.

[11] Patent Number: 4,491,666
[45] Date of Patent: Jan. 1, 1985

[54] PREPARATION OF ANTHRAQUINOID DISPERSE DYES

[75] Inventors: Rolf Niess, Schifferstadt; Karl Schaeffer, Ludwigshafen, both of Fed. Rep. of Germany

[73] Assignee: BASF Aktiengesellschaft, Ludwigshafen, Fed. Rep. of Germany

[21] Appl. No.: 355,308

[22] Filed: Mar. 5, 1982

[30] Foreign Application Priority Data

Mar. 14, 1981 [DE] Fed. Rep. of Germany ....... 3109951

[51] Int. Cl.³ ...................... C07D 209/56; C09B 5/62
[52] U.S. Cl. .................................................. 548/426
[58] Field of Search ......................................... 548/426

[56] References Cited

U.S. PATENT DOCUMENTS 3,268,552 8/1966 Akamatsu et al. ................... 548/426
3,294,815 12/1966 Hartwig et al. ...................... 548/426
3,668,219 6/1972 Otsuka et al. ....................... 548/426

FOREIGN PATENT DOCUMENTS 1073661 7/1960 Fed. Rep. of Germany .
1227144 4/1971 United Kingdom .

Primary Examiner—Glennon H. Hollrah
Assistant Examiner—D. B. Springer
Attorney, Agent, or Firm—Oblon, Fisher, Spivak, McClelland & Maier

[57] ABSTRACT

An improvement in the process for the preparation of dispersed dyes of compounds of the formula

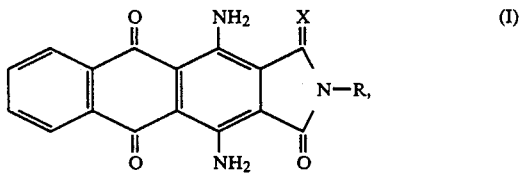

where X is >O or >NH and R is $C_1$-$C_{12}$-alkyl, $C_2$-$C_6$-hydroxyalkyl, alkoxyalkyl of 3 to 12 carbon atoms in total, $C_5$-$C_8$-cycloalkyl, phenoxy-$C_2$- or-$C_3$-alkyl, phenyl-$C_1$-$C_4$-alkyl or phenyl-$C_1$-$C_4$-alkoxy-$C_2$- or -$C_3$-alkyl, by reacting a compound I where R is H with an amine of the formula R-$NH_2$ in a liquid under the influence of heat, wherein the reaction is carried out in water, in the presence or absence of a cationic or non-ionic surfactant.

Very pure dyes are obtained with a high space/time yield.

9 Claims, No Drawings

PREPARATION OF ANTHRAQUINOID DISPERSE DYES

The present invention relates to a process for the preparation of anthraquinoid disperse dyes.

U.S. Pat. Nos. 3,835,154, 2,753,356 and 2,628,963 disclose that dyes of the formula

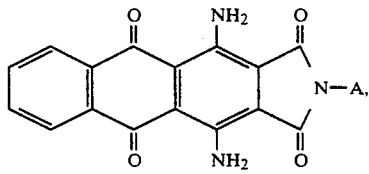

where A is alkyl, alkoxyalkyl, hydroxyalkyl, phenoxyalkyl or phenylaminoakyl, are obtained by reacting a compound of the formula I where A is H with an amine of the formula A—NH$_2$ in an organic solvent. These processes have the disadvantages that expensive organic solvents or solvent mixtures which must be worked up for economic and ecological reasons are required, and the starting materials must be dry and in milled form.

German Pat. No. 1,073,661 discloses that 1-imino-3-oxo-4,7-diamino-5,6-phthaloyl-dihydroisoindole reacts with an aliphatic amine in an inert solvent, eg. methanol, or in excess to give a compound of the formula

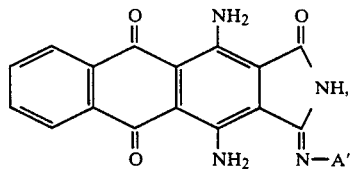

where A' is an aliphatic radical, by replacement of the =NH group.

It is an object of the present invention to provide an improved, simple and inexpensive process for the preparation of anthraquinoid disperse dyes of the formula given below, in which dyes of good quality are obtained in a high yield, and which does not pollute the environment.

We have found that this object is achieved by a process for the preparation of anthraquinoid disperse dyes of the formula

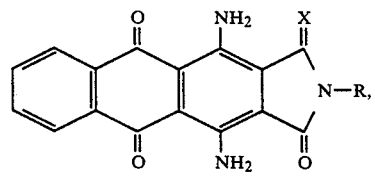

where X is =O or =NH and R is $C_1$-$C_{12}$-alkyl, $C_2$-$C_6$-hydroxyalkyl, alkoxyalkyl of 3 to 12 carbon atoms in total, $C_5$-$C_8$-cycloalkyl, phenoxy-$C_2$-or-$C_3$-alkyl, phenyl-$C_1$-$C_4$-alkyl or phenyl-$C_1$-$C_4$-alkoxy-$C_2$- or -$C_3$-alkyl, by reacting a compound of the formula

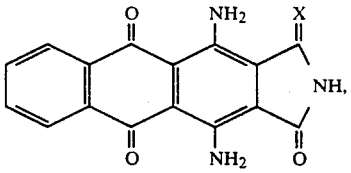

with an amine of the formula $$R-NH_2 \qquad (V),$$

where X and R have the above meanings, in a liquid under the influence of heat, wherein the improvement is that the reaction is carried out in water.

The products are useful disperse dyes which give light-fast, sublimation-fast and laundering-fast brilliant greenish blue dyeings on synthetic hydrophobic fibers.

The process gives very pure dyes of the formula (III) with a high space/time yield. In contrast to the process disclosed in German Pat. No. 1,073,661, in the process of the present invention virtually exclusively products of the formula (III) are obtained from compounds of the formula (IV) where X is >NH.

The process according to the present invention is substantially more economical than the known processes, since expensive solvents are not necessary and accordingly do not have to be recovered. Another advantage is that the starting materials (IV) are used in the form of the moist filter residue from the synthesis process.

R can be $C_1$-$C_{12}$-alkyl, $C_2$-$C_6$-hydroxyalkyl, alkoxyalkyl of 3 to 12 carbon atoms in total, $C_5$-$C_8$-cycloalkyl, phenoxy-$C_2$- or -$C_3$-alkyl, phenyl-$C_1$-$C_4$-alkyl or phenyl-$C_1$-$C_4$-alkoxy-$C_2$- or -$C_3$-alkyl.

Specific examples are:

1. $C_1$-$C_{12}$-alkyl, in particular $C_1$-$C_8$-alkyl: methyl, ethyl, n- and i-propyl, n- and i-butyl, sec.-butyl, pentyl, hexyl, octyl, 2-ethylhexyl, decyl and dodecyl;

2. Hydroxyalkyl: 2-hydroxyethyl, 2- and 3-hydroxypropyl, 1-hydroxybut-4-yl, 2-hydroxybut-3-yl and 6-hydroxy-hex-1-yl;

3. Alkoxyalkyl of 3 to 12 carbon atoms in total: 2-methoxyethyl, 2-ethoxyethyl, 2-n- and -i-propoxyethyl, 2-n- and -i-butoxyethyl, 2-(2'-ethylhexoxy)-ethyl, 3-methoxypropyl, 3-ethoxypropyl, 3-n- and -i-propoxypropyl, 3-n- and -i-butoxypropyl, 3-(2'-ethylhexoxy)-propyl and 3-(n-octoxy)-propyl;

4. Cycloalkyl: cyclopentyl, cyclohexyl, cycloheptyl and cyclooctyl;

5. Phenalkyl: benzyl, 2-phenethyl, 3-phenylpropyl, 2-phenylpropyl, 4-phenylbutyl and 3-phenylbutyl;

6. Phenoxy-$C_2$- or -$C_3$-alkyl: phenoxyethyl and phenoxypropyl;

7. Phenalkoxy-alkyl: benzyloxyethyl, 2-benzyloxypropyl and 3-benzyloxypropyl.

R is preferably $C_2$- or $C_3$-hydroxyalkyl or alkoxyalkyl of 3 to 12 carbon atoms in total.

In general, the process is carried out by introducing the compound of the formula (IV) or a mixture of compounds of the formula (IV) where X is >O and >NH into a mixture of water and the amine R—NH$_2$ and warming the suspension to the desired temperature. The reaction as a rule takes place rapidly and quantitatively at from 70° to 100° C., and is preferably carried out at from 80° to 100° C., in particular from 90° to 100° C.

Depending on the amine (V) used and on the temperature, the reaction time is from 0.5 to 10 hours, in most cases from 2 to 5 hours. Below 80° C., the reaction proceeds very slowly.

Provided the mixture is stirrable before, during and after the reaction, the amount of water required for a successful reaction is not critical. Preferably the amount by weight of water is from 4 to 6 times the weight of (IV).

The amine V is used in not less than the stoichiometrically required amount, and as a rule in excess, advantageously in an amount of from 1.2 to 3 moles per mole of (IV).

The reaction can also be carried out in the presence of not more than 60% by weight, based on (IV), of a cationic or non-ionic surfactant. From 10 to 40% by weight, based on (IV), is in general sufficient if the presence of the surfactant accelerates the reaction.

Examples of suitable cationic surfactants are ammonium salts of the formula

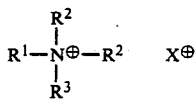

where $R^1$ is $C_4-C_{20}$-alkyl, preferably $C_8-C_{20}$-alkyl, and $R^2$ and $R^3$ are each $C_1-C_4$-alkyl, preferably methyl, or $R^1$ and $R^3$ are each $C_8-C_{20}$-alkyl and $R^2$ is $C_1-C_4$-alkyl, preferably methyl, or $R^1$ is phenyl-$C_1-C_4$-alkyl, $R^2$ is $C_1-C_4$-alkyl and $R^3$ is phenyl or $C_1-C_{20}$-alkyl, or $R^1$ is $C_8-C_{20}$-alkyl or phenyl-$C_1-C_4$-alkyl and

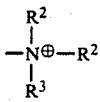

is pyridinium, and $X^\ominus$ is equivalent of an anion.

Suitable non-ionoc surfactants include adducts of ethylene oxide or propylene oxide/ethylene oxide with a $C_2-C_6$-alkanediol or a $C_3-C_6$-alkanepolyol having not more than 5 hydroxyl groups, and adducts of ethylene oxide with a $C_4-C_{20}$-alkylphenol.

However, the above surfactants are generally not required in the process according to the present invention.

The reaction mixture is worked up in the conventional manner by separating off the product from the mother liquor by filtration or centrifugation and washing it with warm water. The mother liquor, which contains the excess of amine and, where relevant, a surfactant, can be reused four or more times as the reaction medium.

In the Examples which follow and illustrate the process according to the present invention, parts and percentages are by weight.

EXAMPLE 1

300 parts of 96% pure 1,4-diaminoanthraquinone-2,3-dicarboximide (formula IV, X=O) were heated to 80° C. in a mixture of 150 parts of the reaction product of 1 mole of nonylphenol with 14 moles of ethylene oxide and 1,300 parts of water, with stirring. 200 parts of 3-methoxypropylamine were added at the above temperature, and the mixture was refluxed (98°-100° C.) for 3 hours. 100 parts of methoxypropylamine were then added, and the mixture was refluxed for a further 2 hours. The suspension was then brought to 75° C. by the addition of 500 parts of cold water, and was filtered with suction. The material on the filter was washed with warm water (about 60° C.). Yield: 1,050 parts of moist presscake containing 349.7 parts of the dye of the formula III where X=O and R=—$(CH_2)_3$—$OCH_3$), which dyes polyester in brilliant greenish blue hues.

EXAMPLE 2

A mixture of 300 parts of 1,4-diaminoanthraquinone-2,3-dicarboximide (formula IV, X=O) in the form of a 46.2% strength aqueous presscake, 1,000 parts of water and 300 parts of 3-methoxypropylamine was heated to the reflux temperature (98°-100° C.), with stirring, and was refluxed for 5 hours. The suspension was cooled to 70° C. and filtered with suction, and the material on the filter was washed with warm water of 60° C. Yield: 1,013 parts of moist presscake containing 345.3 parts of the dye of the formula III where X=O and R=$(CH_2)_3$—$OCH_3$), which dyes polyester in brilliant greenish blue hues.

EXAMPLE 3

A mixture of 325 parts of a moist filter cake, which contained 150 parts of 1,4-diaminoanthraquinone-2,3-dicarboximide, and 700 parts of water and 150 parts of 3-ethoxypropylamine was refluxed (98°-100° C.) for 5 hours. The suspension was cooled to 70° C. and filtered with suction, and the material on the filter was washed with warm water. Yield: 598 parts of presscake containing 184.8 parts of the dye of the formula III where X=O and R=—$(CH_2)_3$—$OC_2H_5$), which dyes polyester in brilliant greenish blue hues.

EXAMPLE 4

The procedure followed was as described in Example 3, but 3-isopropoxypropylamine was used instead of 3-ethoxypropylamine. The presscake isolated contained 189.3 parts of the dye of the formula III where X=O and R=—$(CH_2)_3$—$OCH(CH_3)_2$.

EXAMPLE 5

The procedure followed was as described in Example 3, but a mixture of 50 parts of 3-methoxypropylamine and 100 parts of 3-isopropoxypropylamine was used instead of 3-ethoxypropylamine. The presscake isolated contained 182.6 parts of a mixture of dyes of the formula III where X=O and R=—$(CH_2)_3$—$OCH_3$ or —$(CH_2)_3$—$OCH(CH_3)_2$.

EXAMPLE 6

The procedure followed was as described in Example 3, but ethanolamine was used instead of 3-ethoxypropylamine. The presscake isolated contained 164.7 parts of the dye of the formula III where X=O and R=—$CH_2$-$CH_2$-OH.

EXAMPLE 7

30 parts of a mixture of 1,4-diaminoanthraquinone-2,3-dicarboximide and 1-hydroxy-3-amino-4,7-diamino-5,6-phthaloylisoindolenine in the form of the moist filter cake were introduced into a mixture of 9 parts of the adduct of ethylene oxide with nonylphenol (14:1 moles), 130 parts of water and 30 parts of 3-methoxypropylamine, and the mixture was refluxed (98°-100° C.) for 6 hours. The suspension was cooled to 75° C. and filtered with suction, and the material on the filter was washed with warm water. Yield: 68.8 parts of presscake containing 37.2 parts of a mixture consisting virtually only of dyes of the formula III where X=O or >NH and R=—(CH$_2$)$_3$—OCH$_3$. The dye mixture dyes acetate and polyester in brilliant greenish blue hues.

EXAMPLE 8

300 parts of 94.1% pure 1,4-diaminoanthraquinone-2,3-dicarboximide (formula IV, X=O) were introduced, at room temperature with stirring, into a mixture of 1,300 parts of water, 150 parts of the adduct of 14 moles of ethylene oxide with 1 mole of nonylphenol, 100 parts of methoxypropylamine, 100 parts of ethoxypropylamine, and 100 parts of isopropoxypropylamine. The suspension was refluxed (98°-100° C.) for about 4 hours. The temperature was then brought to 75° C. by cooling and by addition of 500 parts of cold water, and the suspension was filtered with suction. Yield: 1,098 parts of presscake containing 372.5 parts of a mixture of dyes of the formula III where X=O and R=—(CH$_2$)$_3$—OCH$_3$, —(CH$_2$)$_3$-OC$_2$H$_5$ or—(CH$_2$)$_2$—O—CH(CH$_3$)$_2$, which dyes polyester and acetate in brilliant greenish blue hues.

EXAMPLE 9

150 parts of 96% pure 1,4-diaminoanthaquinone-2,3-dicarboximide (formula IV, X=O) were introduced into a mixture of 50 parts of an adduct of ethylene oxide with nonylphenol (14:1 moles), 600 parts of water and 150 parts of 3-isopropoxypropylamine, and the mixture was heated at 98°-100° C. under its autogeneous pressure. After 7 hours, the suspension was cooled to room temperature and filtered with suction. The material on the filter was washed with warm water (about 60° C.). Yield: 575 parts of a presscake containing 188.5 parts of the dye of the formula III where X=O and R=—(CH$_2$)$_3$—O—CH(CH$_3$)$_2$, which dyes polyester in brilliant greenish blue hues.

We claim:

1. In a process for the preparation of an anthraquinoid disperse dye of the formula

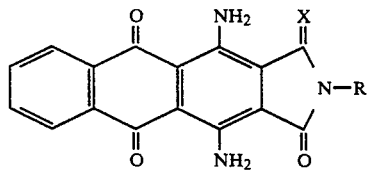

where X is =O or =NH and R is C$_1$-C$_{12}$-alkyl, C$_2$-C$_6$-hydroxyalkyl, alkoxyalkyl of 3 to 12 carbon atoms in total, C$_5$-C$_8$-cycloalkyl, phenoxy-C$_2$-or -C$_3$-alkyl, phenyl-C$_1$-C$_4$-alkyl or phenyl -C$_1$-C$_4$-alkoxy-C$_2$-or -C$_3$-alkyl, comprising the step of reacting a compound of the formula

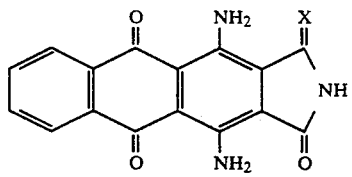

with an amine of the formula

R—NH$_2$ where X and R have the above meanings, the improvement wherein the reaction is carried out in water at from 70° to 100° C.

2. A process as claimed in claim 1, wherein the reaction is carried out at from 80° to 100° C.

3. A process as claimed in claim 1, wherein R is C$_2$- or C$_3$-hydroxyalkyl or alkoxyalkyl of 3 to 12 carbon atoms in total.

4. A process as claimed in claim 1 or 2, wherein the reaction is carried out in the presence of a cationic or non-ionic surfactant.

5. A process as claimed in claim 4, wherein a cationic surface-active agent of the formula

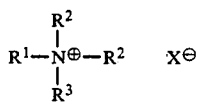

where R$^1$ is C$_4$-C$_{20}$-alkyl and R$^2$ and R$^3$ are each C$_1$-C$_4$-alkyl; or R$^1$ and R$^3$ are each C$_8$-C$_{20}$-alkyl and R$^2$ is C$_1$-C$_4$-alkyl; or R$^1$ is phenyl-C$_1$-C$_4$-alkyl, R$^2$ is C$_1$-C$_4$-alkyl and R$^3$ is phenyl or C$_1$-C$_{20}$-alkyl; or R$^1$ is C$_8$-C$_{20}$-alkyl or phenyl-C$_1$-C$_4$-alkyl and

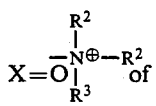

is pyridinium; and X$^\ominus$ is one equivalent of an anion, is used.

6. A process as claimed in claim 4, wherein an adduct of ethylene oxide or propylene oxide/ethylene oxide with a C$_2$-C$_6$-alkanediol or a C$_3$-C$_6$-alkanepolyol having not more than 5 hydroxyl groups, or an adduct of ethylene oxide with a C$_4$-C$_{20}$-alkylphenol, is used as the non-ionic surfactant.

7. A process as claimed in claim 4, wherein the reaction is carried out in the presence of not more than 60% by weight, based on the anthraquinone derivative used as the starting compound, of surfactant.

8. A process as claimed in claim 5, wherein from 10 to 40% by weight, based on the anthraquinone derivative used as the starting compound, of surfactant is used.

9. A process as claimed in claim 6, wherein from 10 to 40% by weight, based on the anthraquinone derivative used as the starting compound, of surfactant is used.

* * * * *